United States Patent [19]

Saint-Prix et al.

[11] Patent Number: 4,511,280
[45] Date of Patent: Apr. 16, 1985

[54] ANCHORING OR CONNECTING SLEEVE FOR MULTISTRAND CABLE CONDUCTOR

[75] Inventors: Robert Saint-Prix, Saint-Etienne; Henri Montmartin, Unieux, both of France

[73] Assignee: Societe Nouvelle des Etablissements Dervaux, Chambon Feugerolles, France

[21] Appl. No.: 398,239

[22] Filed: Jul. 14, 1982

[30] Foreign Application Priority Data

Jul. 15, 1981 [FR] France .................... 81 14115

[51] Int. Cl.³ ............................. F16G 11/02
[52] U.S. Cl. ..................... 403/274; 29/517; 339/276 R
[58] Field of Search .......... 339/174 R; 174/79, 84 C, 174/90; 403/284, 285, 274, 300, 305, 212; 29/517

[56] References Cited

U.S. PATENT DOCUMENTS

| | | | |
|---|---|---|---|
| 2,327,650 | 8/1943 | Klein | 403/285 |
| 2,375,741 | 6/1945 | Dibner | 339/276 R |
| 2,759,256 | 8/1956 | Bergan | 29/517 |
| 2,939,732 | 6/1960 | Rochester, Jr. | |
| 3,006,983 | 10/1961 | McDurmont | 403/285 X |
| 3,015,685 | 1/1962 | Gerlach et al. | |
| 3,120,023 | 2/1964 | Ustin | 403/248 X |
| 3,428,739 | 2/1969 | Jackson | 339/276 R |
| 3,996,417 | 12/1976 | Annas | 174/79 X |
| 4,004,446 | 1/1977 | Dalgleish et al. | 29/517 X |
| 4,005,522 | 2/1977 | Dalgleish et al. | 29/517 |
| 4,061,367 | 12/1977 | Moebius | 403/285 X |

FOREIGN PATENT DOCUMENTS

| | | |
|---|---|---|
| 1016512 | 9/1957 | Fed. Rep. of Germany . |
| 509153 | 1/1955 | Italy ............ 403/305 |
| 718602 | 11/1954 | United Kingdom . |
| 938242 | 10/1963 | United Kingdom . |

Primary Examiner—Richard J. Scanlan, Jr.
Attorney, Agent, or Firm—Karl F. Ross; Herbert Dubno

[57] ABSTRACT

A multistrand cable, especially one with several steel strands forming a central core and with a surrounding sheath consisting of a larger number of outer strands of aluminum or the like, is embraced by a deformable sleeve with a bore of generally polygonal cross-section radially constricted therearound to serve as an anchor or a connector. The sides of the polygon, defining flat or curved faces in contact with the sheath, are separated by longitudinal incisions whereby these faces approach one another under the constrictive stresses in order to exert a firm grip on the inner strands through the intermediary of the outer strands.

8 Claims, 4 Drawing Figures

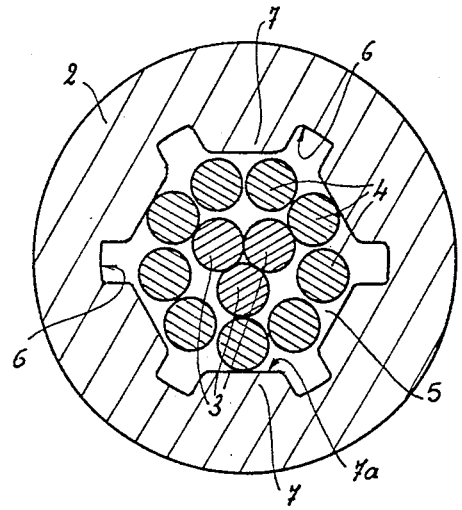
FIG_1
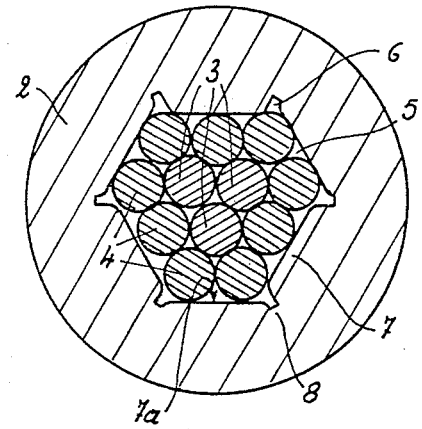
FIG_2
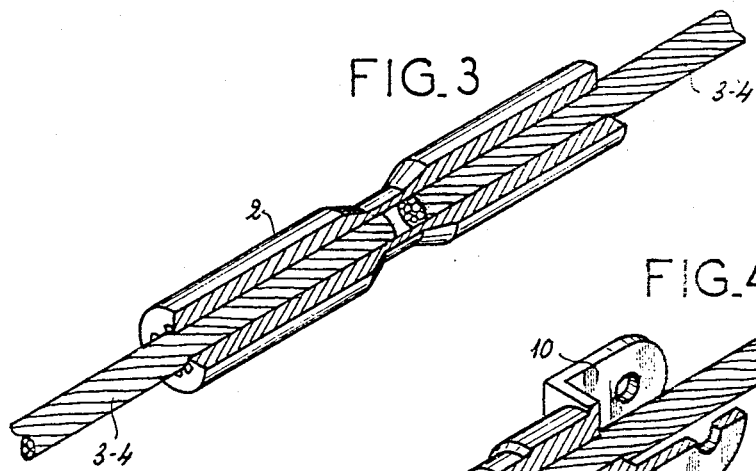
FIG_3
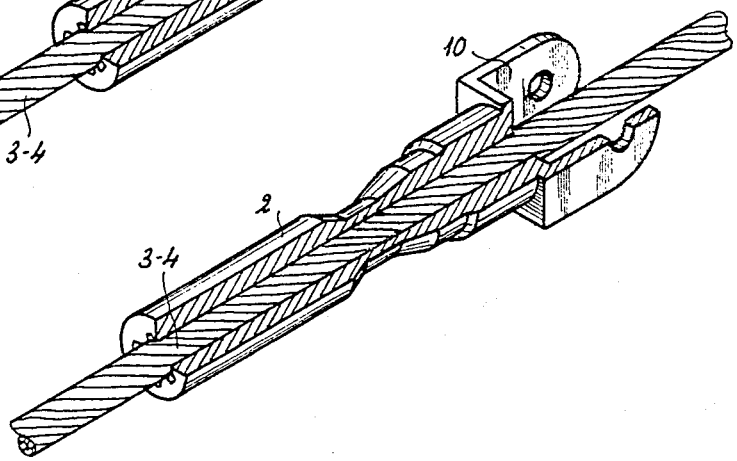
FIG_4

ANCHORING OR CONNECTING SLEEVE FOR MULTISTRAND CABLE CONDUCTOR

FIELD OF THE INVENTION

Our present invention relates to an anchoring and connecting sleeve designed to be constricted on a heterogeneous electric conductor, i.e. one including a core of steel strands serving as an armature therefor and an external sheath consisting of strands of aluminum, an aluminum alloy or similar electrically conductive material.

BACKGROUND OF THE INVENTION

Traditionally, these sleeves comprise a cylindrical bore of circular cross-section. Upon constriction, the radial stresses distribute themselves around the cylindrical bore which, owing to the vault effect, does not impart them completely to all outer strands of the heterogeneous cable. This well-known effect prevents the collapse of an arched structure under radial stresses acting concurrently on it from all sides. Likewise, under the action of these stresses, the outer strands come into contact with one another and, on account of the camber effect, fail to transmit entirely the forces received by them to the strands of the steel core. As a result, on the one hand, the steel core is poorly gripped and, on the other hand, the outer strands, made from a material having an elongation coefficient greater than that of the material of the inner strands and subjected to stresses higher than those exerted on the inner strands, elongate much more than these inner strands and form, at the exit of the sleeve, an enlargement usually termed "birdcage".

In order to obtain a better retention of the core, it is necessary to have sleeves exerting different radial clamping stresses upon the core and upon the sheath and requiring a separation of the strands of the sheath to obtain direct access to the ccore. This is a time-consuming operation and prevents mounting of the sleeve on a cable under electric voltage.

OBJECT OF THE INVENTION

The object of our present invention is to remedy these inconveniences and to provide a sleeve which, for the same magnitude of radial stresses bringing about its constriction, ensures a better retention of the cable and obviates the birdcage effect on heterogeneous cables without requiring a local separation of the strands of the sheath in order to have access to the core.

SUMMARY OF THE INVENTION

To this end, the bore of a cable-gripping sleeve according to our invention has a noncircular cross section which, in order to break up the vault effect, is composed of contact faces. The latter, which may be flat or curved, are designed to be applied under pressure against the outer strands of a multistrand cable and are separated by connecting zones whose mechanical deformation permits these contact faces to approach one another in response to radial stresses exerted on the tubular sleeve body.

Upon the constriction of the sleeve on a multistrand conductor, the vault effect of the bore and the camber effect of the outer strands are broken up and the latter, by differently distributing themselves, can transmit to the strands of the core all the stresses which they receive. Thus, the retention of the core is ensured in a reliable manner.

BRIEF DESCRIPTION OF THE DRAWING

The above and other features of our invention will now be described in detail with reference to the accompanying schematic drawing showing, by way of a nonlimiting example, an embodiment of this sleeve.

In the drawing:

FIG. 1 is a transverse sectional view showing a sleeve according to our invention after engagement of the extremity of a heterogeneous cable but prior to constriction of that sleeve by radial stresses;

FIG. 2 is a view similar to FIG. 1 but showing the sleeve after its constriction on the cable; and FIGS. 3 and 4 are perspective views, partially in section, showing, respectively, a connecting sleeve and an anchoring sleeve embodying our invention.

FIGS. 1 and 2 show a cylindrical sleeve 2 designed for the anchoring of a heterogeneous electric conductor consisting of a central core formed from three steel strands 3 and of an external sheath formed as a wreath of nine strands 4 of aluminum, of an aluminum alloy or of a similar electrically conductive material.

In this embodiment, the core 5 of the sleeve 2 exhibits six longitudinal grooves 6 delimiting ribs 7 between them whose generally flat contact faces 7a form a polygon, specifically a hexagon. The bottoms of the grooves 6, together with the wall of the sleeve, delimit connecting zones or bridges 8 between the several ribs 7.

As FIGS. 1 and 2 show, the grooves 6 disrupt the vault effect which would exist in the sleeve in their absence. In fact, upon the constriction of the sleeve, the weakening of the wall due to the connecting bridges 8 enables the radial approach of the contact faces 7a toward one another. Moreover, the grooves 6 form zones of separation for the material when the same is subjected to the constrictive stresses. This results in a reduction of the perimeter embraced by the contact faces 7a of the ribs 7 and in a strong pressure of these contact faces 7a on the outer strands 4 of the conductor 3–4. The fact that certain strands 4 of the cable 3–4 are not in contact with a face 7a of the ribs 7 causes a disruption of the camber effect in the corresponding wreath of strands 4 and, consequently, a reduction of the reaction of the sleeve 2 opposing its constriction. It will be noted that the grooves 6 are substantially narrower than the faces 7 and, in the constricted state of FIG. 2, have a width substantially less than the diameter of strands 3, 4.

Traction tests, up to the sliding of the cable relative to the constricted sleeve, have shown that the sleeves according to the invention ensure a retention of the conductor which, exceeding that obtained with existing sleeves subjected to the same constrictive stresses, was also higher than that considered optimal for this type of conductor.

It should be noted that this possibility of constricting the sleeve 2 results also in decreasing its elongation, especially when the constriction is obtained by stretching, whereby any risk of birdcage formation at the exit of the sleeve by the aluminum strands 4 is practically excluded.

It is apparent that our present invention is not limited to the above-described embodiment and, on the contrary, includes all kinds of modifications concerning the cross-section of the grooves, their number and their distribution, as well as the shape and the distribution of the ribs and the general configuration of the noncircular cross-section of the bore 5.

Thus, the sleeve may have a cylindrical outer periphery whose cross-section is circular, as shown, or noncircular, i.e. a regular or irregular polygon with or without longitudinal grooves, channels or ribs. Likewise, the polygonal cross-section of its bore can be regular or not and can be bounded by flat, convex or concave faces. Finally, the grooves and ribs can be rectilinear but also helicoidal, continuous or discontinuous.

The constriction of the sleeve can be brought about by any known technical means such as stretching, compression, hammering or the like.

This sleeve can be mounted on any heterogeneous conductor composed of a core formed by several strands or by several wreaths of strands and of an external conducting sheath formed by one or more wreaths of strands; such a sleeve could also be used on any homogeneous conductor and on mechanical cables. When it is utilized to interconnect two separated conductors, it has the generally tubular shape illustrated in FIG. 3. Since good retention of the conductor by our improved sleeve does not require even a local separation of the conductive sheath from the inner steel core, as is the case with existing sleeves, this sleeve can be disposed by remote handling on a conductor under electric voltage. There is thus no need to interrupt the current feed, e.g. for the installation of a temporary shunt on a damaged supply line.

When the sleeve is utilized for anchoring a conductor, it is extended, as FIG. 4 shows, by a bracket 10 which is traversed by the conductor emerging from the bore of the sleeve. The exertion of constructive stresses over the desired length of the conductor guarantees the reliability of the anchorage and, again, is performed without the need for separating the sheath from the core.

From FIGS. 2, 3 and 4 it will be apparent that sleeve 2 still has a cylindrical outer surface throughout the limited region in which it grips the conductor or conductors under all-around radial stress.

We claim:

1. A cable-gripping sleeve comprising a tubular body of deformable material with a central bore of noncircular cross-section, said bore forming a multiplicity of generally flat cable-contacting faces separated by longitudinal zones of reduced wall thickness forming internal grooves substantially narrower than said faces facilitating an approach of said faces to one another upon an exertion of radial stresses serving to constrict said body around an engaged cable.

2. A sleeve as defined in claim 1 wherein said cross-section is substantially polygonal, the sides of the polygon defining said faces and being separated by said grooves.

3. In combination, a multistrand cable and a sleeve of deformable material gripping said cable over a limited region under all-around radial stress, said sleeve having a central bore of noncircular cross-section forming a multiplicity of generally flat cable-contacting faces separated by longitudinal zones of reduced wall thickness forming internal grooves substantially narrower than said faces, said sleeve having a cylindrical outer surface throughout said limited region.

4. The combination defined in claim 3 wherein said cross-section is substantially polygonal, the sides of the polygon defining said faces and being separated by said grooves.

5. The combination defined in claim 3 or 4 wherein said cable has a core consisting of several inner strands and a surrounding sheath consisting of a larger number of outer strands, said outer strands being in contact with said faces and transmitting pressure therefrom to said inner strands, said grooves having a width substantially less than the diameter of at least said outer strands.

6. The combination defined in claim 5 wherein said outer strands consist of a material having a larger elongation coefficient than the material of said inner strands.

7. The combination defined in claim 6 wherein said inner strands consist of steel and the material of said outer strands contains aluminum.

8. The combination defined in claim 5 wherein said cross-section is substantially hexagonal, said core consisting of three inner strands and said sheath consisting of nine outer strands.

* * * * *